(12) United States Patent
Smet (10) Patent No.: US 10,359,029 B2
(45) Date of Patent: Jul. 23, 2019

(54) CONNECTION PIECE FOR A PITCH TUBE (71) Applicants: ZF Friedrichshafen AG, Friedrichshafen (DE); ZF WIND POWER ANTWERPEN N.V., Lommel (BE)

(72) Inventor: Wim Smet, Temse (BE)

(73) Assignees: ZF Friedrichshafen AG, Friedrichshafen (DE); ZF Wind Power Antwerpen N.V., Lommel (BE)

( * ) Notice: Subject to any disclaimer, the term of this patent is extended or adjusted under 35 U.S.C. 154(b) by 399 days.

(21) Appl. No.: 15/110,786

(22) PCT Filed: Dec. 15, 2014

(86) PCT No.: PCT/EP2014/077702
§ 371 (c)(1),
(2) Date: Jul. 11, 2016

(87) PCT Pub. No.: WO2015/106898
PCT Pub. Date: Jul. 23, 2015

(65) Prior Publication Data
US 2016/0341183 A1 Nov. 24, 2016

(30) Foreign Application Priority Data
Jan. 16, 2014 (DE) .................. 10 2014 200 674

(51) Int. Cl.
*F03D 7/02* (2006.01)
*F03D 15/00* (2016.01)
(Continued)

(52) U.S. Cl.
CPC ........... *F03D 80/85* (2016.05); *F03D 7/0224* (2013.01); *F03D 15/00* (2016.05); *F03D 80/70* (2016.05);
(Continued)

(58) Field of Classification Search
CPC ........ F03D 80/70; F03D 80/85; F03D 7/0224; F16C 2360/31; F16H 57/043; Y02E 10/72
See application file for complete search history.

(56) References Cited

U.S. PATENT DOCUMENTS 4,798,404 A * 1/1989 Iyanicki ................ F16L 19/062
285/12
2008/0292463 A1* 11/2008 Munch .................. F03D 7/0224
416/155
(Continued)

FOREIGN PATENT DOCUMENTS

CH           666 106 A5    6/1988
DE   10 2010 060 147 A1    4/2012
(Continued)

OTHER PUBLICATIONS

German Search Report Corresponding to 10 2014 200 674.0 dated Mar. 25, 2015.
(Continued)

*Primary Examiner* — Richard A Edgar
*Assistant Examiner* — Elton K Wong
(74) *Attorney, Agent, or Firm* — Davis & Bujold PLLC; Michael J. Bujold (57) ABSTRACT

A connection piece for a pitch tube of a wind turbine in which the connection piece comprises a receiving portion into which the pitch tube is at least partially insertable. The connection piece is made from at least first and second parts. The first part comprises a first, at least partially annular sealing surface and the second part comprises a second, at least partially annular sealing surface. The first sealing surface and the second sealing surface, together with part of the surface of the pitch tube, form at least part of a surface that delimits a hollow space for receiving a seal, when the pitch tube is inserted into the receiving portion. At least one
(Continued)

element varies the spacing distance between the first sealing surface and the second sealing surface.

8 Claims, 7 Drawing Sheets

(51) Int. Cl.
  F03D 80/70 (2016.01)
  F03D 80/80 (2016.01)
  F16H 57/04 (2010.01)

(52) U.S. Cl.
  CPC ... *F05B 2260/40311* (2013.01); *F16H 57/043* (2013.01); *Y02E 10/72* (2013.01)

(56) References Cited

U.S. PATENT DOCUMENTS

| | | | |
|---|---|---|---|
| 2010/0007151 A1* | 1/2010 | Ciszak | F16H 57/043 290/55 |
| 2010/0062888 A1* | 3/2010 | Ciszak | F03D 15/00 475/31 |
| 2010/0133854 A1* | 6/2010 | Jansen | F16H 1/28 290/1 C |
| 2010/0329867 A1 | 12/2010 | Patel et al. | |
| 2013/0130862 A1* | 5/2013 | Sprenger | F16H 1/28 475/331 |

FOREIGN PATENT DOCUMENTS

| | | |
|---|---|---|
| DE | 10 2011 119 471 A1 | 5/2013 |
| EP | 0 192 015 A1 | 8/1986 |

OTHER PUBLICATIONS

International Search Corresponding to PCT/EP2014/077702 dated Feb. 27, 2015.
Written Opinion Corresponding to PCT/EP2014/077702 dated Feb. 27, 2015.

* cited by examiner

CONNECTION PIECE FOR A PITCH TUBE

This application is a National Stage completion of PCT/EP2014/077702 filed Dec. 15, 2014, which claims priority from German patent application serial no. 10 2014 200 674.0 filed Jan. 16, 2014.

FIELD OF THE INVENTION

The invention concerns a connection piece for a pitch tube of a wind.

BACKGROUND OF THE INVENTION

In technical circles a pitch tube denotes a guide duct in a wind turbine, such that at least part of the guide duct extends at least in part through a rotor shaft of the wind turbine. The rotor shaft connects a rotor, comprising a rotor hub and wind-driven rotor blades, in a rotationally fixed manner to an input shaft of a transmission. The pitch tube extends coaxially with the rotational axis of the rotor shaft or rotor, that is to say, the pitch tube is rotationally symmetrical relative to a rotation axis that extends along the rotational axis of the rotor shaft or rotor, i.e. that is identical to the rotational axis of the rotor shaft or rotor.

To be able to adjust the blade angle (pitch adjustment), electric leads are needed which run between the rotor and a connection terminal on the generator side. Among other things the pitch tube serves to guide these leads through the rotor shaft.

The pitch tube can also be used to supply oil to a transmission of the wind turbine. For example, DE 10 2011 119 471 A1 proposes a double-walled pitch tube having an outer and an inner tube. The hollow space formed between the inner tube and the outer tube in this case serves to convey lubrication oil to the transmission. The electric leads run through the inner tube.

Figure 1:
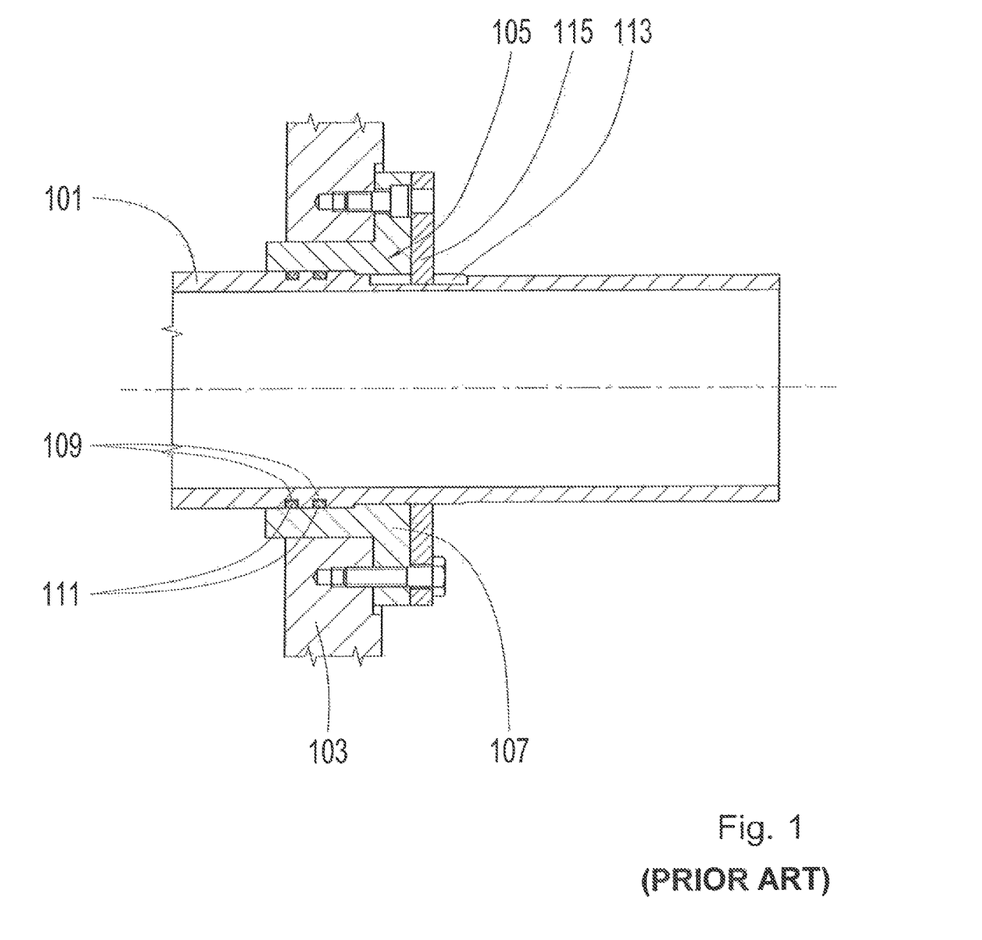
FIG. 1: A connection piece known from the prior art, on the rotor side.
Figure 2:
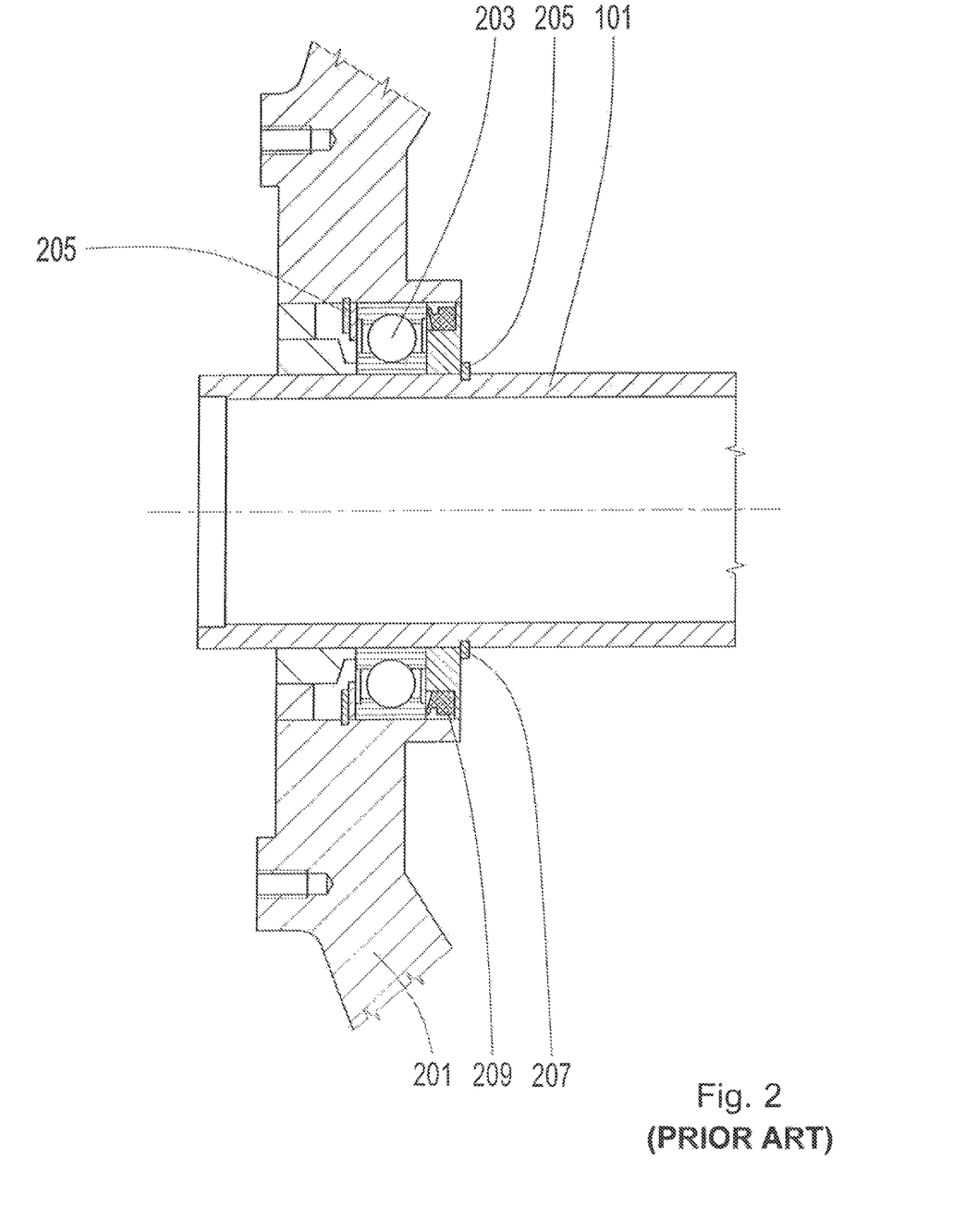
FIG. 2: A connection piece known from the prior art, on the generator side.

FIGS. 1 and 2 show a system known from the prior art for integrating a pitch tube 101 in a transmission of a wind turbine. FIG. 1 illustrates a rotor-side fixing method for the pitch tube 101. The pitch tube 101 is passed through an opening in a planetary carrier 103 driven by the rotor. To couple the pitch tube 101 to the planetary carrier 103, a connection piece 105 is provided. This has a flange 107 which is bolted to the planetary carrier 103. To prevent oil from leaking out from the transmission between the pitch tube and the connection piece 105, the pitch tube is provided with two all-round grooves 109 in each of which an O-ring 111 is set. The O-rings 111 seal the pitch tube 101 relative to the connection piece 105. In addition the pitch tube 101 is formed with a slot-shaped recess 113. In this recess there engages a securing strip 115 attached to the connection piece 105. Thereby, a rotationally fixed connection is formed between the pitch tube 101 and the planetary carrier 103. In particular, the pitch tube 101 and the planetary carrier 103 are connected in a rotationally fixed manner. Accordingly, the pitch tube 101 rotates along with the rotor.

FIG. 2 shows the generator-side end of the pitch tube 101 opposite to the rotor-side end thereof shown in FIG. 1. On the generator side the pitch tube 101 passes through a housing 201 of the transmission. Since the pitch tube 101 rotates along with the planetary carrier 103 whereas the housing 201 is fixed, the pitch tube 101 is mounted to rotate in the housing 201 by virtue of a bearing 203. A locking ring 205 attached to the housing 201 and a locking ring 207 attached to the pitch tube 101 fix the bearing 203 in the axial direction. A sealing ring 209 prevents oil from leaking out of the transmission between the housing 201 and the pitch tube 101.

In the system described strict demands are made on the dimensional accuracy of the pitch tube 101. On the one hand the gap between the pitch tube 101 and the connection piece 105 has to be very narrow. Otherwise, the sealing action of the O-rings 111 would be insufficient, so that oil could escape from the transmission through the gap. On the other hand, at its generator-side end the pitch tube 101 serves as a bearing seat. Accordingly, the outer diameter of the pitch tube at that point must maintain as accurately as possible an oversize relative to the diameter of the inner race of the bearing, as required for a bearing seat.

The electrical leads running through the pitch tube 101 also rotate together with the pitch tube 101. Thus a coupling is needed, in order to connect the rotationally fixed leads on the generator side with the rotating leads in the pitch tube 101. Accordingly, the pitch tube 101 must be designed at its generator-side end in such manner that it can be connected to the coupling As a rule, the connection on the generator side also has to comply with specifications issued by the equipment manufacturer.

SUMMARY OF THE INVENTION

The purpose of the present invention is to integrate a pitch tube in a transmission of a wind turbine while avoiding the disadvantages inherent in the systems known from the prior art. In particular the cost of the pitch tube and the effort entailed in producing the pitch tube should be reduced.

This objective is achieved by a connection piece for a pitch tube of a wind turbine, having the characteristics as described below.

The connection piece according to the invention comprises a receiving portion into which the pitch tube can be introduced, at least in part. This does not exclude the possibility that the pitch tube can pass through the receiving portion. Preferably, however, the receiving portion is designed such that an outlet of the pitch tube is on the inside of the connection piece when the pitch tube has been inserted into the receiving portion. Since as a rule the pitch tube is in the form of a straight, circular hollow cylinder, the receiving portion is preferably also cylindrical, i.e. it encloses a straight, circular cylinder.

According to the invention, the receiving portion is made in at least two parts. In that case a first part of the connection piece forms a first of the at least two parts and a second part of the connection piece forms a second of the at least two parts. The first and second parts form parts of the connection piece separate and distinct from one another.

The first part comprises a first, at least partially annular sealing surface. Correspondingly, the second part comprises a second, at least partially annular sealing surface. Thus, the first sealing surface and the second sealing surface each have at least a partial surface that extends in a circle. The two part-surfaces are provided as contact surfaces for a seal.

Preferably, the two part-surfaces are directed radially, i.e. they each extend in a radial plane, that is to say a plane directed perpendicularly to a rotational axis. It is also preferable for the two part-surfaces to be arranged coaxially relative to the rotational axis. Thus, the two part-surfaces are arranged rotationally symmetrically about an axis of symmetry that extends along the rotational axis, i.e. one that is identical to the rotational axis.

The rotational axis is preferably the rotational axis of the pitch tube. This is preferably identical to the rotational axis of a planetary carrier and/or the rotational axis of a rotor of the wind turbine, which in particular can be connected in a rotationally fixed manner to the planetary carrier.

The first sealing surface and the second sealing surface are arranged so that together with part of the surface, in particular the outer surface of the pitch tube, they form at least part of a surface that delimits a hollow space when the pitch tube has been introduced into the receiving portion and is in the receiving portion. The hollow space is designed to hold the seal. The hollow space is delimited at least by the first sealing surface, the second sealing surface and the above-mentioned part of the surface of the pitch tube. The first sealing surface and the second sealing surface are part of a hollow or recess or channel or groove that extends coaxially relative to the rotational axis inside the receiving portion. The seal can be inserted into the recess. When the pitch tube is inserted into the receiving portion, the part of the surface of the pitch tube extends along the mouth of the recess and so closes off the recess, so that the hollow space is formed.

The connection piece comprises at least one means for moving the first sealing surface and the second sealing surface toward one another and against the seal. In particular, the means serves to move the first sealing surface and the second sealing surface toward one another in the axial direction, i.e. along the direction of the rotational axis.

To assemble the connection piece onto the pitch tube, the seal is first placed between the first sealing surface and the second sealing surface, i.e. in the recess. Then, the connection piece is introduced into the receiving portion. By virtue of the means the first sealing surface and the second sealing surface can now be moved toward one another in such manner that the distance between the first and second sealing surfaces decreases. The result is that the first and second sealing surfaces press against the seal. That in turn results in a deformation of the seal in the radial direction, particularly inward. Consequently, the seal is pressed against the pitch tube. The seal is held in contact with the pitch tube along an area that extends coaxially relative to the rotational axis. Thanks to this a seal is formed between the connection piece and the pitch tube, so that no oil can leak out between the connection piece and the pitch tube. Furthermore, the pitch tube is secured in the connection piece against any displacement in the axial direction, i.e. in the direction of the rotational axis.

The connection piece according to the invention lakes it possible to use almost any pitch tube, since by virtue of the seal deformation described comparatively large dimensional tolerances of the pitch tube can be compensated. In particular a pitch tube made of a plastic, such as PVC-C, or a glass-fiber-reinforced epoxide resin, can be used. The pitch tube can also consist of a coated metal.

In a preferred further development of the invention, the rotor and/or the rotor shaft and/or the planetary carrier form the first part of the connection piece. This means that the rotor and/or the rotor shaft and/or the planetary carrier comprise the first part of the connection piece. Thus, the first part of the connection piece is part of the rotor and/or the rotor shaft and/or the planetary carrier. In particular, the rotor and/or the rotor shaft and/or the planetary carrier can be made integrally, in one piece. This integration of the first part in the rotor and/or the rotor shaft and/or the planetary carrier reduces the number of components of the transmission and thus also its manufacturing costs.

In another preferred further development, the second part of the connection piece comprises a flange. With this, the second part can be bolted onto the first part. This reduces the distance between the first sealing surface and the second sealing surface, so that the first and second sealing surfaces are moved toward one another and press against the seal.

In particular, the flange is provided with holes through which bolts can be passed. Correspondingly, the second part has threaded bores for receiving the bolts. A second part of the connection piece provided with a flange is particularly suitable for receiving the pitch tube on the rotor side. In this case the flange is preferably bolted to the rotor, the rotor shaft or the planetary carrier, so that the rotor and/or the rotor shaft and/or the planetary carrier form the first part of the connection piece.

In another preferred further development, instead of the flange a thread pair serves to vary the distance between the first sealing surface and the second sealing surface. In this case the first part of the connection piece has a first thread of the thread pair. Correspondingly, the second part of the connection piece has a second thread of the thread pair. By rotating the first thread relative to the second thread the distance between the first and second sealing surfaces is varied. When the first thread is screwed into the second thread or the second thread into the first thread, the first and second sealing surfaces are thereby pressed against the seal.

Particularly preferred, especially for receiving the pitch tube on the generator side, is a further development with a first part of the connection piece that forms a bearing seat or a bearing contact surface. The bearing seat serves to hold a bearing, in particular an inner race of the bearing. Thus, the inner race of the bearing can be pushed onto the bearing seat. In this case the bearing seat serves to fix the bearing in the radial direction. To fix the bearing or its inner race in the axial direction, the connection piece can have at least one groove into which a locking ring is set.

The inner race of the bearing and the first part of the connection piece can be made integrally. This means that the first part of the connection piece forms the bearing contact surface. In this case the bearing is preferably a slide bearing. However, an integral design of the first part of the connection piece with the inner race of a roller bearing is also possible.

The bearing serves to support the pitch tube relative to a fixed transmission component. The outer race of the bearing is in that case fixed in the transmission component. In particular, the fixed transmission component can be a transmission housing.

In the systems known from the prior art, the pitch tube comprises the bearing seat. In that area, however, special requirements relate both to dimensional accuracy and load-bearing capacity. As a result of the relocation of the bearing seat or the bearing contact surface in the first part of the connection piece, the pitch tube no longer has to meet those requirements and can therefore have more generous tolerances.

Also preferred is a connection piece having a first part and/or a second part with a coupling for the connection of at least one electric lead and/or at least one lubricant line. Thus, the coupling is part of the first and/or the second part of the connection piece. In particular, the first and/or second part can be integrally connected to the coupling. This eliminates the need to provide a separate coupling and to fix it by some elaborate means onto the pitch tube.

BRIEF DESCRIPTION OF THE DRAWINGS

FIGS. 1 and 2 show systems known from the prior art. Example embodiments of the present invention, to be described in more detail below, are illustrated in FIGS. 3 to 7. In these, the same indexes denote the same or functionally equivalent features. The figures show:

DETAILED DESCRIPTION OF THE PREFERRED EMBODIMENTS

Figure 3:
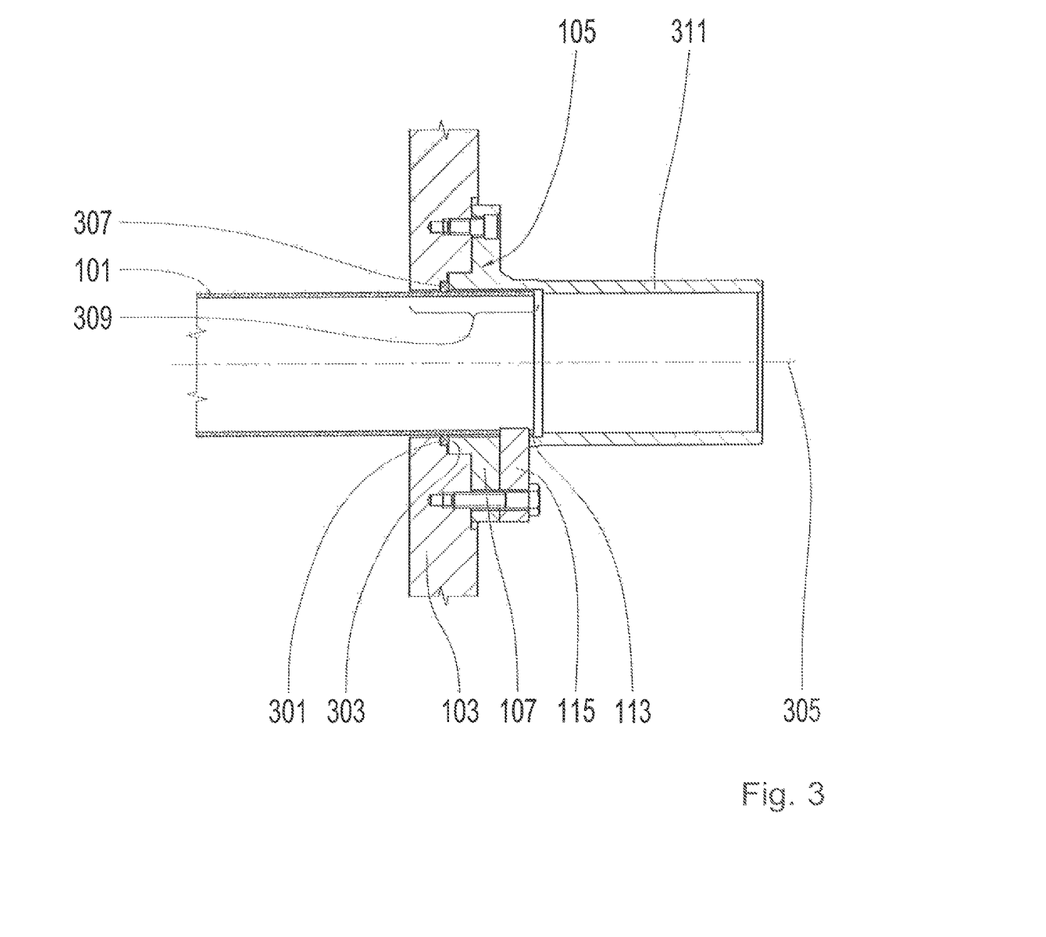
FIG. 3: A connection piece on the rotor side, with an O-ring that can be compressed.

As shown in FIG. 3, the connection piece 105 is made in two parts. A first part of the connection piece 105 is formed by the planetary carrier 103. The flange 107 forms a second part of the connection piece 105. Otherwise than in the system shown in FIG. 1, the connection piece 105 has no groove 109 for receiving a sealing element. Instead, the planetary carrier 103 and the flange 107 each form a respective annular sealing surface 301, 303 directed radially. The sealing surfaces 301, 303 fate toward one another and form a gap that extends rotationally-symmetrical around a rotational axis 305. In that gap is fitted an O-ring 307.

The pitch tube 101 can be inserted into a section of the connection piece 105 designed as a receiving portion 309. The sealing surfaces 301, 303 are arranged in such manner that the O-ring 307 is in contact with the sealing surfaces 301, 303 and with the pitch tube 101 inserted into the receiving portion 309. Thus, the O-ring seals the sealing surfaces 301, 303 and so too the planetary carrier 103 or connection piece 105 relative to the pitch tube 101. In that way the O-ring 307 prevents oil from leaking out between the pitch tube 101 and the planetary carrier 103 or connection piece 105. In particular, the O-ring 307 prevents oil from making its way into the pitch tube 101.

The flange has through-bores. Corresponding threaded bores are formed in the planetary carrier 103, so that the flange 107 can be bolted onto the planetary carrier 103. This reduces the distance between the sealing surfaces 301, 303. In turn, this results in deformation of the O-ring 307. The O-ring 307 is compressed by the sealing surfaces 301, 303.

As a result of its deformation the O-ring 307 exerts a pressure on the pitch tube 101 along an area that extends in the circumferential direction of the pitch tube 101. This fixes the pitch tube 101 in the connection piece 105. In addition, the deformation of the O-ring 307 compensates any dimensional deviations of the pitch tube 101.

Figure 4:
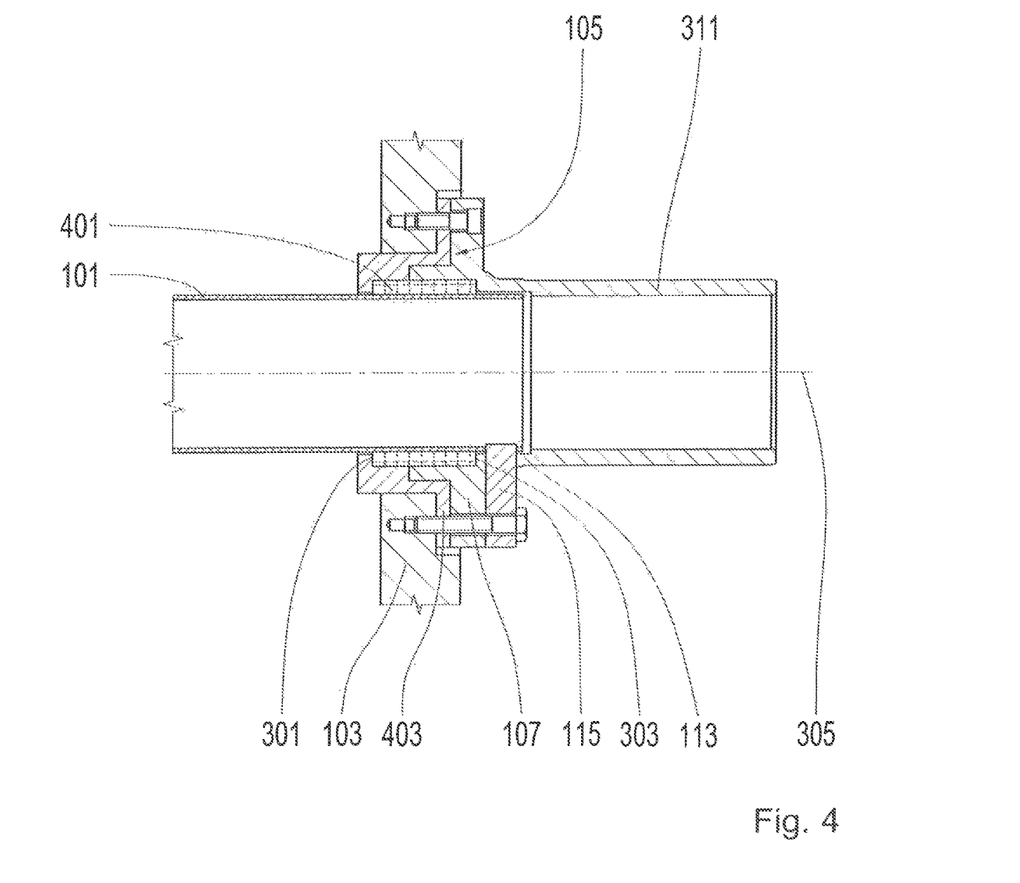
FIG. 4: A connection piece on the rotor side, with a sealing tube that can be compressed.

FIG. 4 shows a variant of the example embodiment in FIG. 3, in which instead of the O-ring 307 a sealing tube 401 is used. The sealing tube 401 is in the form of a hollow cylinder that fits into the gap between the sealing surfaces 301, 303. In cross-section, the sealing tube 401 and the gap are rectangle-shaped.

In the axial direction the sealing tube 401 projects beyond the planetary carrier 103. Accordingly, instead of the planetary carrier 103 the first part of the connection piece 105 is formed by an intermediate element 403. Together with the flange 107 and the coupling 311, which form the second part of the connection piece 105, the intermediate element 403 is bolted onto the planetary carrier 103. Analogously to the variant shown in FIG. 3, this enables the distance between the sealing surfaces 301, 303 to be reduced and the sealing tube 401, therefore, to be deformed.

Figure 5:
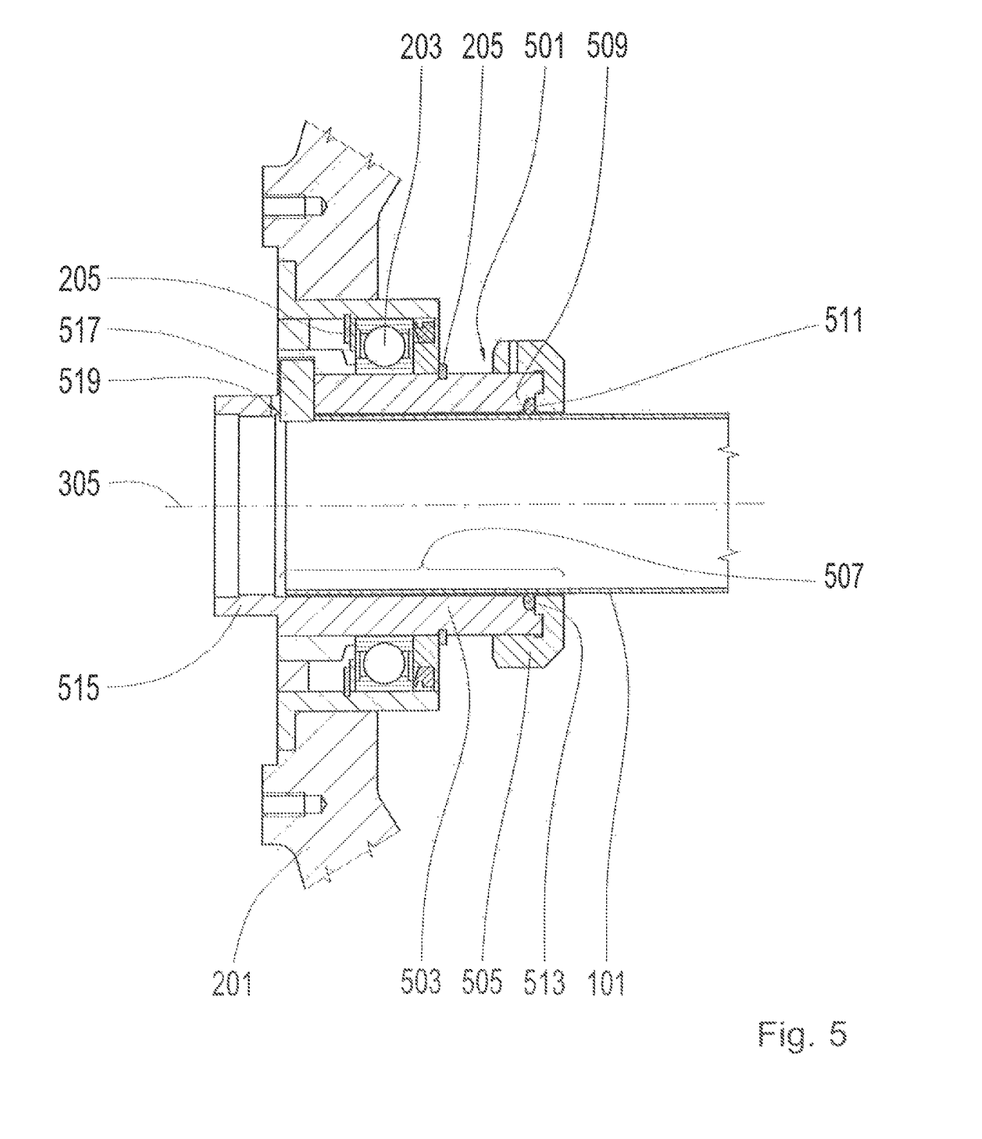
FIG. 5: A connection piece on the generator side, with an O-ring that can be compressed.

FIG. 5 shows a connection piece 501 in the form of a generator-side pendant to the connection piece 105 in FIG. 3. The connection piece 501 comprises a sleeve 503 and a cap nut 505. The sleeve 503 has a receiving portion 507 into which the pitch tube 101 can be inserted. The sleeve 503 and the cap nut 505 have in each case a radially directed, annular sealing surface 509, 511. Between the sealing surfaces 509, 511 there is a gap, which is rotationally symmetrical relative to the rotational axis 305. This gap serves to receive an O-ring 513.

When the cap nut 505 is screwed onto the sleeve 503, the distance between the two sealing surfaces 509, 511 decreases. Consequently the gap too becomes smaller so that the O-ring 513 is deformed and pressed against the pitch tube 101.

The sleeve 503 is connected integrally with a coupling 515 on the generator side. The purpose of the coupling is to connect electric leads arranged on the generator side with the electric leads running through the pitch tube 101.

Also on the generator side is arranged a securing strip 517. This is fixed in the sleeve 503 and engages in a groove 519 of the pitch tube 101 on the generator side. In this way, on the generator side the connection piece 501 is coupled in a rotationally fixed manner to the pitch tube 101.

To fit the pitch tube 101 with the generator-side connection piece 501 rotatably in the transmission housing 201, bearing concepts known from the prior art are suitable, such as the bearing concept shown in FIG. 2. However, according to FIG. 5 the mounting, in particular the bearing 203 with the associated locking ring 205, is not attached directly on the pitch tube 101, but rather, on the sleeve 503. Thus, the outer diameter of the pitch tube 101 does not have to correspond to the inner diameter of the bearing 203. Accordingly, the requirements demanded by virtue of the mounting method, in particular where manufacturing tolerances are concerned, again do not have to be met here by the pitch tube 101, but only by the sleeve 503.

Figure 6:
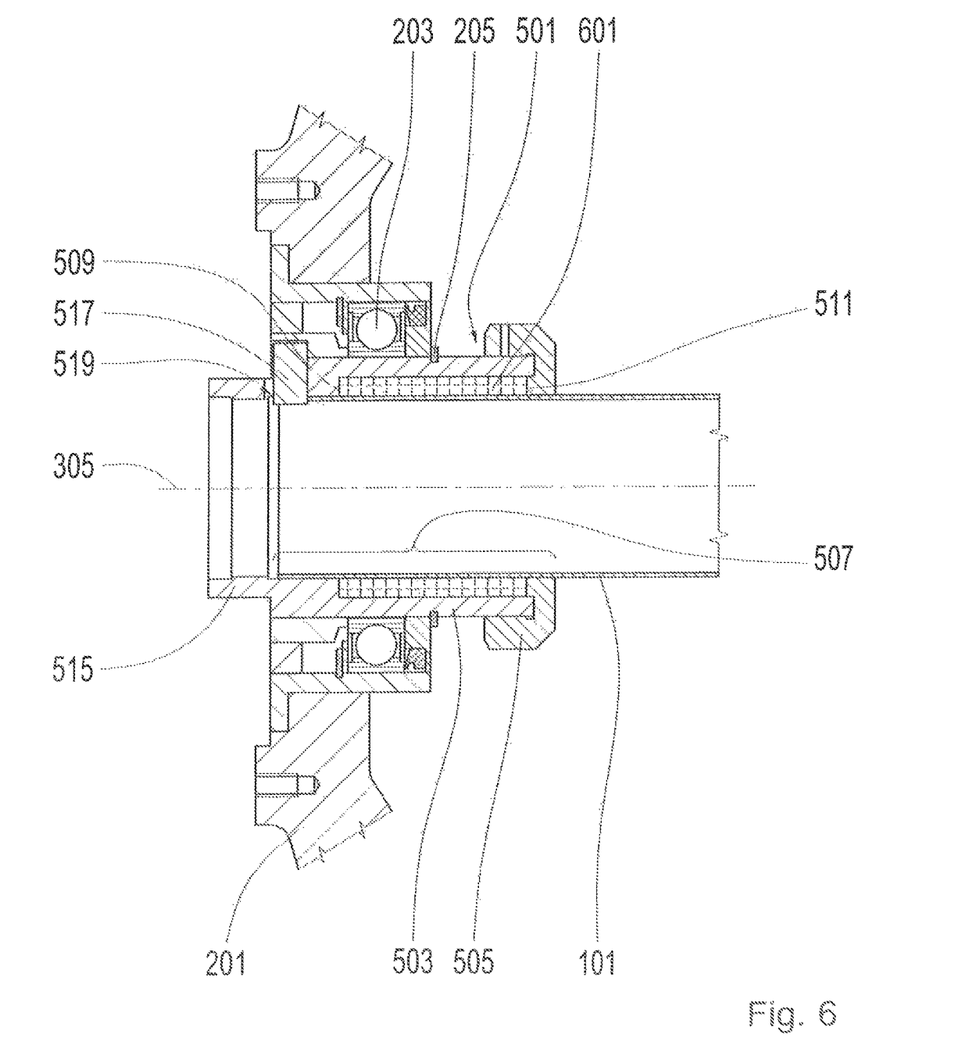
FIG. 6: A connection piece on the generator side, with a sealing tube that can be compressed.

A variant of the connection piece 501 is shown in FIG. 6. In contrast to the connection piece 501 in FIG. 5, which comprises an O-ring 513 as a seal, the connection piece 501 according to FIG. 6 comprises a sealing tube 601. This is fitted instead of the O-ring 513 into the gap formed between the sealing surfaces 509, 511. Correspondingly, the gap is shaped as a hollow cylinder and is rotationally symmetrical around the rotational axis 305, having a rectangular cross-section.

Figure 7:
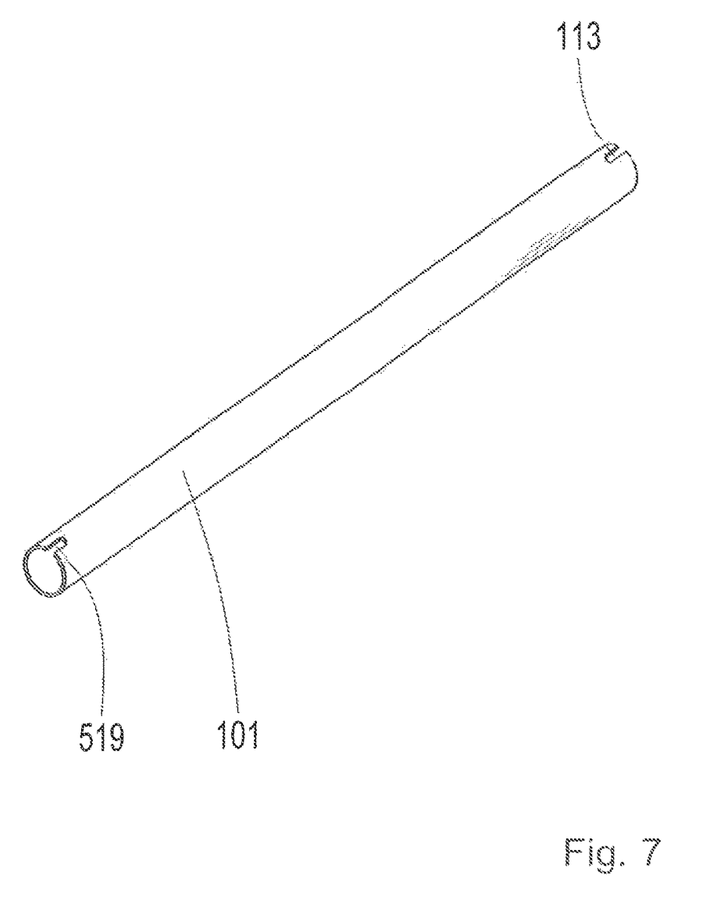
FIG. 7: A pitch tube.

FIG. 7 shows the pitch tube 101, with the groove 113 on the rotor side and the groove 519 on the generator side.

Indexes

101 Pitch tube
103 Planetary carrier
105 Connection piece
107 Flange
109 Groove
111 O-ring
113 Recess
115 Securing strip
201 Housing
230 Bearing
205 Locking ring
207 Locking ring
209 Seal 301 Sealing surface
303 Sealing surface
305 Rotational axis
307 O-ring
309 Receiving portion
311 Coupling
401 Sealing tube
403 Intermediate element
501 Connection piece
503 Sleeve
505 Cap nut
507 Receiving portion
509 Sealing surface
511 Sealing surface
513 O-ring
515 Coupling
517 Securing strip
601 Sealing tube

The invention claimed is:

1. A connection piece for a pitch tube of a wind turbine, the connection piece comprising:
a receiving portion into which the pitch tube can be at least partially slidably inserted,
the connection piece being made from at least first and second parts;
the first part comprising a first, at least partially annular sealing surface;
the second part comprising a second, at least partially annular sealing surface;
the first sealing surface and the second sealing surface together with a portion of a surface of the pitch tube forming at least part of a surface that delimits a hollow space for receiving a seal when the pitch tube is inserted into the receiving portion,
wherein the seal is a sealing tube or an o-ring; and
at least one means for varying a distance between the first sealing surface and the second sealing surface to deform the seal in a radial direction as the distance between the first sealing surface and the second sealing surface is slidably reduced.

2. The connection piece according to claim 1, wherein at least one of a rotor, a rotor shaft and a planetary carrier of the wind turbine forms the first part of the connection piece.

3. The connection piece according to claim 1, wherein the first part of the connection piece comprises a first thread and the second part of the connection piece comprises a second thread so that the distance between the first sealing surface and the second sealing surface is varied when the first thread and the second thread are screwed together.

4. The connection piece according to claim 1, wherein the first part of the connection piece forms either a bearing seat or a bearing contact surface.

5. The connection piece according to claim 1, wherein at least one of the first part and the second part of the connection piece comprises a coupling for connection of at least one of an electric lead and a lubricant line.

6. A connection piece for a pitch tube of a wind turbine, the connection piece comprising:
a receiving portion into which the pitch tube can be at least partially inserted,
the connection piece being made from at least first and second parts;
the first part comprising a first, at least partially annular sealing surface;
the second part comprising a second, at least partially annular sealing surface;
the first sealing surface and the second sealing surface together with a portion of a surface of the pitch tube forming at least part of a surface that delimits a hollow space for receiving a seal when the pitch tube is inserted into the receiving portion; and
at least one means for varying a distance between the first sealing surface and the second sealing surface,
wherein the second part of the connection piece comprises a flange by which the second part is bolted onto the first part so that the first sealing surface and the second sealing surface , are pressed against the seal.

7. A first part of a connection piece for a pitch tube of a wind turbine, the first part comprising:
a receiving portion into which the pitch tube can be at least partially slidably inserted,
the first part comprising a first, at least partially annular sealing surface;
the first sealing surface, when mated with a second sealing surface of a second part, together with a portion of a surface of the pitch tube forming at least part of a surface that delimits a hollow space for receiving a seal once the pitch tube is slidably inserted into the receiving portion; and
at least one means for varying a distance between the first sealing surface and the second sealing surface to deform the seal in a radial direction as the distance between the first sealing surface and the second sealing surface is slidably reduced.

8. A second part of a connection piece for a pitch tube of a wind turbine, the second part comprising:
a receiving portion into which the pitch tube can be at least partially inserted,
the second part comprising a second, at least partially annular sealing surface;
the second sealing surface, when mated with a first sealing surface of a first part, together with a portion of a surface of the pitch tube forming at least part of a surface that delimits a hollow space for receiving a seal when the pitch tube (101) is inserted into the receiving portion,
wherein the seal is a sealing tube; and
at least one means for varying a distance between the first sealing surface and the second sealing surface to deform the seal in a radial direction as the distance between the first sealing surface and the second sealing surface is slidably reduced.

* * * * *